US012775318B2

(12) United States Patent
Yi et al.

(10) Patent No.: US 12,775,318 B2
(45) Date of Patent: Oct. 27, 2026

(54) DISPLAY PANEL AND DISPLAY TERMINAL

(71) Applicant: WUHAN CHINA STAR OPTOELECTRONICS SEMICONDUCTOR DISPLAY TECHNOLOGY CO., LTD., Wuhan (CN)

(72) Inventors: Shijuan Yi, Wuhan (CN); Liang Sun, Wuhan (CN); Likun Cheng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 708 days.

(21) Appl. No.: 17/779,748

(22) PCT Filed: Mar. 30, 2022

(86) PCT No.: PCT/CN2022/083962
§ 371 (c)(1),
(2) Date: May 25, 2022

(87) PCT Pub. No.: WO2023/168769
PCT Pub. Date: Sep. 14, 2023

(65) Prior Publication Data

US 2023/0280806 A1 Sep. 7, 2023

(30) Foreign Application Priority Data

Mar. 7, 2022 (CN) ........................ 202210217217.2

(51) Int. Cl.
*G06F 1/26* (2006.01)
*G06F 1/16* (2006.01)

(52) U.S. Cl.
CPC .............. *G06F 1/26* (2013.01); *G06F 1/1652* (2013.01)

(58) Field of Classification Search
CPC .................... G06F 1/16; G06F 1/1652; H10K 59/131–1315; H10K 59/179–1795;
(Continued)

(56) References Cited

U.S. PATENT DOCUMENTS 6,259,504 B1 * 7/2001 Shin .................... G09G 3/3648 349/108
2016/0293571 A1 10/2016 Yoon et al.
(Continued)

FOREIGN PATENT DOCUMENTS

CN 107994052 A 5/2018
CN 108206005 A 6/2018
(Continued)

OTHER PUBLICATIONS

Ikeda_English, ikeda translation (Year: 2019).*
(Continued)

*Primary Examiner* — Minsun O Harvey
*Assistant Examiner* — Alexander Ehrlich
(74) *Attorney, Agent, or Firm* — The Roy Gross Law Firm, LLC; Roy D. Gross

(57) ABSTRACT

The present disclosure provides a display panel and a display terminal. The display panel includes a plurality of island-shaped units and a plurality of bending structures; the plurality of the island-shaped units are arranged separately; adjacent two of the island-shaped units are stretched and connected by one of the bending structures, the bending structures includes a plurality of metal lines, adjacent two of the island-shaped units are electrically connected through the plurality of the metal lines, and the plurality of the metal lines includes only a scanning line.

20 Claims, 8 Drawing Sheets

(58) Field of Classification Search
CPC ........ G09G 2300/0426; G09G 2380/02; G02F 1/1345–13458; H01L 27/124–1244
See application file for complete search history.

(56) References Cited

U.S. PATENT DOCUMENTS

| | | | |
|---|---|---|---|
| 2019/0311674 | A1 | 10/2019 | Shin et al. |
| 2022/0039248 | A1 | 2/2022 | Sano |

FOREIGN PATENT DOCUMENTS

| | | | | | |
|---|---|---|---|---|---|
| CN | 109830504 | A | | 5/2019 | |
| CN | 111210726 | A | | 5/2020 | |
| CN | 112054042 | A | | 12/2020 | |
| CN | 109378332 | B | * | 1/2021 | ........... H10K 59/131 |
| CN | 112289182 | A | | 1/2021 | |
| CN | 112582382 | A | | 3/2021 | |
| CN | 112669709 | A | | 4/2021 | |
| CN | 112669710 | A | | 4/2021 | |
| CN | 112802858 | A | | 5/2021 | |
| JP | 2019074568 | A | * | 5/2019 | ........... G09G 3/2003 |
| KR | 20190107261 | A | * | 9/2019 | ........... G09G 3/3225 |
| WO | WO-2020001032 | A1 | * | 1/2020 | ......... H01L 27/1218 |
| WO | WO-2020217784 | A1 | * | 10/2020 | ............. H05K 1/028 |
| WO | 2021020750 | A1 | | 2/2021 | |

OTHER PUBLICATIONS

Sano_English, sano translation (Year: 2020).*
Sun_English, sun translation (Year: 2019).*
Ma_English, ma translation (Year: 2020).*
Liu_English3, liu translation (Year: 2021).*
PCT International Search Report for International Application No. PCT/CN2022/083962, mailed on Nov. 25, 2022, 11pp.
PCT Written Opinion of the International Search Authority for International Application No. PCT/CN2022/083962, mailed on Nov. 25, 2022, 8pp.
Chinese Office Action issued in corresponding Chinese Patent Application No. 202210217217.2 dated Apr. 21, 2023, pp. 1-6, 15pp.

* cited by examiner

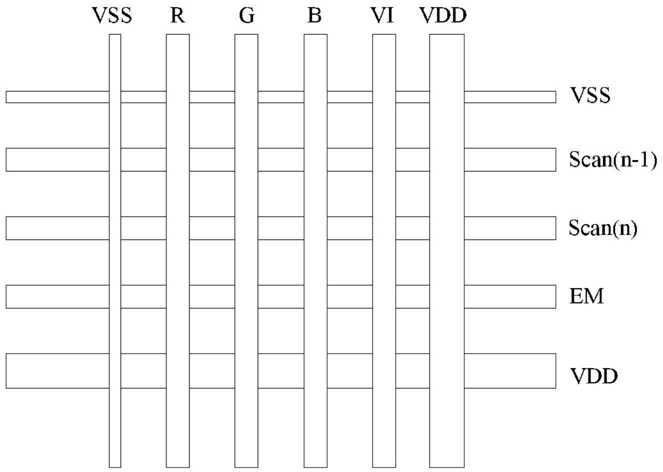
FIG. 1-PRIOR ART
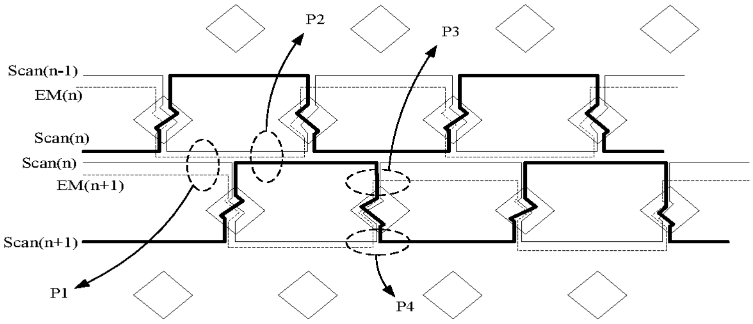
FIG. 2-PRIOR ART

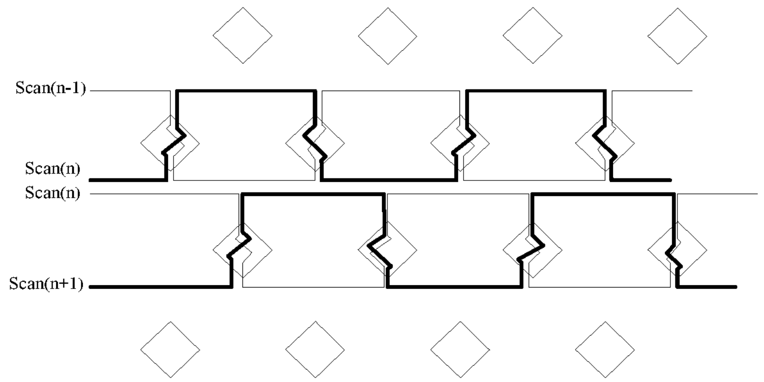
FIG. 3A-PRIOR ART
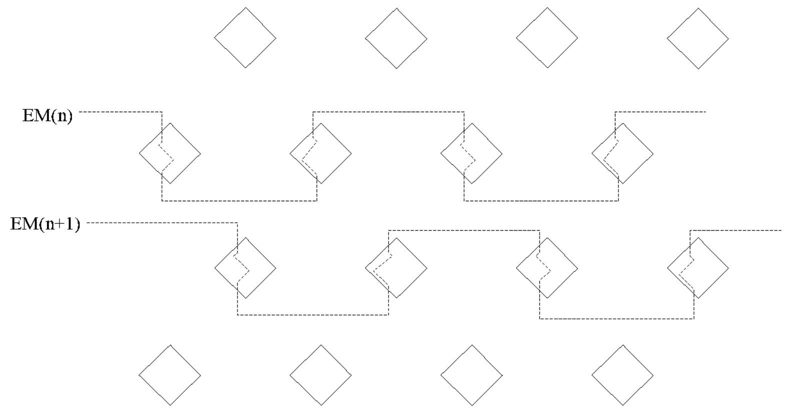
FIG. 3B-PRIOR ART

DISPLAY PANEL AND DISPLAY TERMINAL

CROSS REFERENCE TO RELATED APPLICATIONS

This application is a National Phase of PCT Patent Application No. PCT/CN2022/083962 having International filing date of Mar. 30, 2022, which claims the benefit of priority of Chinese Patent Application No. 202210217217.2, filed Mar. 7, 2022, the contents of which are all incorporated herein by reference in their entirety.

FIELD OF INVENTION

The present disclosure relates to a field of display technology, and particularly to a display panel and a display terminal.

BACKGROUND OF INVENTION

Stretchable display technology, as an important technical upgrade of flexible displays after folding technology, has an ability to deform and stretch in any direction, can effectively solve existing technical questions, such as tetrahedral, non-gaussian curved surface bonding, display area bending, etc., and has broad application prospects. In an existing stretchable display panel, in order to facilitate tensile strain, display units of the stretchable display panel are spread out in a shape of islands, and these island-shaped units are connected through ribbon-like hinge regions (bending structures), wherein pixel circuits of the stretchable display panel are distributed in the island-shaped units, and connection lines (a plurality of metal lines) between the pixel circuits are distributed on the bending structures.

When the stretchable display panel is stretched and deformed, the bending structures will be deformed by force, wherein a strain resistance of the bending structures is inversely proportional to a width of the bending structures. At present, single-layer or multi-layer titanium (Ti)/aluminum (Al)/titanium (Ti) wiring is often used for the bending structures. Same-layer wirings are placed in parallel on a same layer, and a certain distance in a horizontal direction between two adjacent of the same-layer wirings is reserved to prevent short circuit. As shown in FIG. 1, which is a schematic diagram of wirings of the island-shaped units in prior art, due to a large number of metal lines in the bending structures such as data lines (data R/G/B), scanning lines (Scan(n−1), Scan(n)), luminescence control line (EM), power supply line (VI, VDD, VSS), etc. causing the bending structures to be too wide, a bending performance of the bending structures is affected. Therefore, it is necessary to improve this defect.

SUMMARY OF INVENTION

Technical Problem

Embodiments of the present disclosure provides a display panel, which is used to solve a technical problem including a number of the metal lines in the bending structures of a display panel in prior art being too large, which causes the bending structures to be too wide, which affects a bending performance of the bending structures.

Technical Solutions

Embodiments of the present disclosure provides a display panel, including: a plurality of island-shaped units, the plurality of the island-shaped units being arranged separately; and a plurality of bending structures, adjacent two of the island-shaped units being stretched and being connected by one of the bending structures, each of the bending structures including a plurality of metal lines, adjacent two of the island-shaped units being electrically connected to each other through the plurality of the metal lines, and the plurality of the metal lines including merely one scanning line.

In the display panel in an embodiment of the present disclosure, each of the island-shaped units is connected to four of the bending structures respectively.

In the display panel in an embodiment of the present disclosure, among the four of the bending structures connected to one of the island-shaped units, scanning lines in adjacent two of the bending structures are parts of a same scanning line.

In the display panel in an embodiment of the present disclosure, each of the island-shaped units includes a first protruding portion and a second protruding portion, and the first protruding portion and the second protruding portion are disposed opposite to each other; among the four of the bending structures connected to one of the island-shaped units, the adjacent two of the bending structures are connected to a same of the first protruding portion or a same of the second protruding portion.

In the display panel in an embodiment of the present disclosure, in a direction from the first protruding portion to the second protruding portion, a height of the first protruding portion and a height of the second protruding portion are both greater than or equal to 1 micrometer and less than or equal to 100 micrometers.

In the display panel in an embodiment of the present disclosure, in the direction from the first protruding portion to the second protruding portion, the height of the first protruding portion is equal to the height of the second protruding portion.

In the display panel in an embodiment of the present disclosure, the plurality of the metal lines further include luminescence control lines, initialization power lines, driving power lines, and common power lines; wherein, each of the island-shaped units is electrically connected to an adjacent one of the luminescence control lines; adjacent two of the initialization power lines are electrically connected to each other through the island-shaped units located between the adjacent two of the initialization power lines; adjacent two of the driving power lines are electrically connected to each other through the island-shaped units located between the adjacent two of the driving power lines; adjacent two of the common power lines are electrically connected to each other through the island-shaped units located between the adjacent two of the common power lines.

In the display panel in an embodiment of the present disclosure, the display panel further includes a plurality of first data lines and a plurality of second data lines; and each of the island-shaped units is provided with one of the first data lines and one of the second data lines passing through; a first end of one of the first data lines passing through one of the island-shaped units is electrically connected to a second end of one of the second data lines passing through an adjacent one of the island-shaped units through one of the bending structures; a second end of the one of the first data lines passing through the one of the island-shaped units is electrically connected to a first end of another one of the second data lines passing through another adjacent of the island-shaped units through another one of the bending structures; and a first end of the one of the second data lines passing through the one of the island-shaped units is electrically connected to a second end of another one of the first data lines passing through another adjacent of the island-shaped units by another one of the bending structures; a second end of the one of the second data lines passing through the one of the plurality of island-shaped units is electrically connected to a first end of another one of the first data lines passing through another adjacent of the island-shaped units through another one of the bending structures.

In the display panel in an embodiment of the present disclosure, each of the island-shaped units is one display unit, the plurality of the island-shaped units include a plurality of first display units, a plurality of second display units, and a plurality of third display units, sub-pixels of each of the first display units are a red sub-pixel and a green sub-pixel, sub-pixels of each of the second display units are a green sub-pixel and a blue sub-pixels, and sub-pixels of each of the third display units are a blue sub-pixel and a red sub-pixel; wherein, four of the island-shaped units adjacent to a same one of the first display units are two of the second display units and two of the third display units respectively, and two of the second display units are located on a side of the same one of the first display units, and two of the third display units are located on another side of the same one of the first display units.

In the display panel in an embodiment of the present disclosure, each of the island-shaped units is one display unit, the plurality of the island-shaped units comprise a plurality of first display units and a plurality of second display units, sub-pixels of each of the first display units are a red sub-pixel and a green sub-pixel, and sub-pixels of each of the second display units are a green sub-pixel and a blue sub-pixel; wherein, four of the island-shaped units adjacent to a same one of the first display unit are all the second display units.

In the display panel in an embodiment of the present disclosure, the display panel further includes: a substrate layer; a first metal layer disposed on the substrate layer, the first metal layer being patterned to form the scanning lines, the luminescence control lines, the first data lines, and the second data lines; a second metal layer disposed on the first metal layer, the second metal layer being patterned to form the driving power lines and the common power lines; and a third metal layer disposed on the second metal layer, the third metal layer being patterned to form the initialization power lines; wherein, an orthographic projection of the third metal layer, an orthographic projection of the second metal layer, an orthographic projection of the first data lines, and an orthographic projection of the second data lines on the substrate layer are non-overlapping.

Embodiments of the present disclosure further provides a display terminal, including a terminal body and a display panel, the terminal body and the display panel being combined into one, and the display panel including: a plurality of island-shaped units, the plurality of the island-shaped units being arranged separately; and a plurality of bending structures, wherein, adjacent two of the island-shaped units being stretched and being connected by one of the bending structures, each of the bending structures comprising a plurality of metal lines, adjacent two of the island-shaped units being electrically connected to each other through the plurality of metal lines, and the plurality of metal lines comprising merely one scanning line.

In the display terminal in an embodiment of the present disclosure, each of the plurality of island-shaped units is connected to four of the plurality of bending structures respectively.

In the display terminal in an embodiment of the present disclosure, among the four of the bending structures connected to one of the island-shaped units, scanning lines in adjacent two of the bending structures are parts of a same scanning line.

In the display terminal in an embodiment of the present disclosure, each of the island-shaped units includes a first protruding portion and a second protruding portion, and the first protruding portion and the second protruding portion are disposed opposite to each other; among the four of the bending structures connected to one of the island-shaped units, the adjacent two of the bending structures are connected to a same of the first protruding portion or a same of the second protruding portion.

In the display terminal in an embodiment of the present disclosure, the plurality of the metal lines further comprise luminescence control lines, initialization power lines, driving power lines, and common power lines; wherein, each of the island-shaped units is electrically connected to an adjacent one of the luminescence control lines; adjacent two of the initialization power lines are electrically connected to each other through the island-shaped units located between the adjacent two of the initialization power lines; adjacent two of the driving power lines are electrically connected to each other through the island-shaped units located between the adjacent two of the driving power lines; adjacent two of the common power lines are electrically connected to each other through the island-shaped units located between the adjacent two of the common power lines.

In the display terminal in an embodiment of the present disclosure, the display panel further comprises a plurality of first data lines and a plurality of second data lines; and each of the plurality of island-shaped units is provided with one of the first data lines and one of the second data lines passing through; a first end of one of the first data lines passing through one of the island-shaped units is electrically connected to a second end of one of the second data lines passing through an adjacent one of the island-shaped units through one of the bending structures; a second end of the one of the first data lines passing through the one of the island-shaped units is electrically connected to a first end of another one of the second data lines passing through another adjacent of the island-shaped units through another one of the bending structures; and a first end of the one of the second data lines passing through the one of the island-shaped units is electrically connected to a second end of another one of the first data lines passing through another adjacent one of the island-shaped units through another one of the island-shaped units; a second end of another one of the second data lines passing through the one of the island-shaped units is electrically connected to a first end of another one of the second data lines passing through another adjacent one of the island-shaped units through another one of the bending structures.

In the display terminal in an embodiment of the present disclosure, each of the island-shaped units is one display unit, the plurality of the island-shaped units includes a plurality of first display units, a plurality of second display units, and a plurality of third display units, sub-pixels of each one of the first display units are a red sub-pixel and a green sub-pixel, sub-pixels of each one of the second display units are a green sub-pixel and a blue sub-pixels, and sub-pixels of each one of the third display units are a blue sub-pixel and a red sub-pixel; wherein, four of the island-shaped units adjacent to a same one of the first display unit are two of the second display units and two of the third display units respectively, and two of the second display units are located on a side of the same one of the first display units, two of the third display units are located on another side of the same one of the first display units.

In the display terminal in an embodiment of the present disclosure, each of the island-shaped units is one display unit, the plurality of the island-shaped units comprise a plurality of first display units and a plurality of second display units, sub-pixels of each of the first display units are a red sub-pixel and a green sub-pixel, and sub-pixels of each of the second display units are a green sub-pixel and a blue sub-pixels; wherein, the four of the island-shaped units adjacent to a same one of the first display unit are all the second display units.

In the display terminal in an embodiment of the present disclosure, the display panel further includes: a substrate layer; a first metal layer disposed on the substrate layer, the first metal layer being patterned to form the scanning lines, the luminescence control lines, the first data lines and the second data lines; a second metal layer disposed on the first metal layer, the second metal layer being patterned to form the driving power lines and the common power lines; and a third metal layer disposed on the second metal layer, the third metal layer being patterned to form the initialization power lines; wherein, an orthographic projection of the third metal layer, an orthographic projection of the second metal layer, an orthographic projection of the first data lines, and an orthographic projection of the second data lines on the substrate layer are non-overlapping.

Beneficial Effect

The display panel provided by an embodiment of the present disclosure includes a plurality of island-shaped units, the plurality of the island-shaped units being arranged separately; and a plurality of bending structures, adjacent two of the island-shaped units being stretched and being connected by one of the bending structures, each of the bending structures including a plurality of metal lines, adjacent two of the island-shaped units being electrically connected to each other through the plurality of the metal lines, and the plurality of the metal lines including merely one scanning line. Compared with two scanning lines (Scan(n−1), Scan(n)) that need to be set in one existing bending structure, only one scanning line is provided in a bending structure of the display panel of the present disclosure, one scanning line is reduced, so that the width of the bending structure is reduced, and the bending performance of the bending structure is improved.

BRIEF DESCRIPTION OF DRAWINGS

In order to explain embodiments or technical solutions in the prior art more clearly, the following will briefly introduce drawings involved in a following description of the embodiments.

FIG. 1 is a diagram of wirings of island-shaped units in prior art.

FIG. 2 is a schematic wiring diagram of scanning lines and luminescence control lines in prior art.

FIG. 3A is a schematic diagram of wirings of scanning lines in prior art.

FIG. 3B is a schematic diagram of wirings of luminescence control lines in prior art.

DETAILED DESCRIPTION OF EMBODIMENTS

Figure 4:
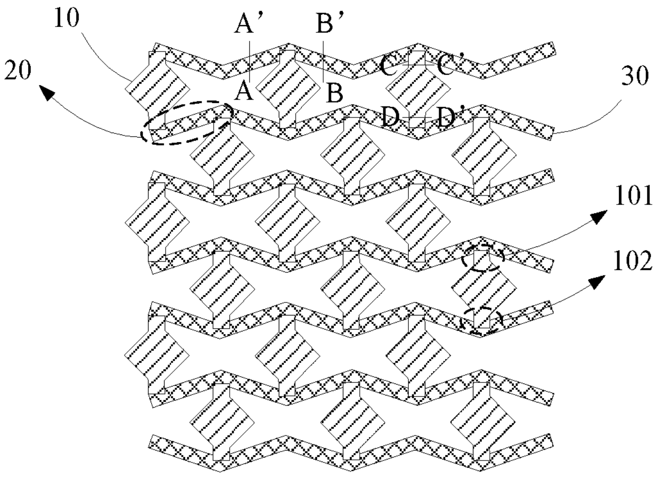
FIG. 4 is a schematic diagram of a basic structure of a display panel provided by an embodiment of the present disclosure.

The technical solutions in the embodiments of the present disclosure will be clearly and completely described in conjunction with the drawings in the embodiments of the present disclosure. In the drawings, for clarity and ease of understanding and description, dimensions and thicknesses of components depicted in the drawings are not to scale.

As shown in FIG. 2, it is a schematic diagram of wirings of scanning lines and luminescence control lines in a prior art. In detail, as shown in FIG. 3A and FIG. 3B, they are a schematic diagram of wirings of scanning lines in a prior art and a schematic diagram of wirings of luminescence control lines in a prior art. From FIG. 3A and FIG. 3B, it is obvious that there are two scanning lines (Scan(n−1) and Scan(n), or Scan(n) and Scan(n+1)) and a luminescence control line (EM(n) or EM(n+1)) in an island-shaped unit.

Continuing to refer to FIG. 2, in a bending structure, there are two scanning lines (Scan(n−1) and Scan(n)) and two luminescence control lines (EM(n) and EM(n+1)) at P1; there are two scanning lines (Scan(n−1) and Scan(n+1)) and one luminescence control line EM(n) at P2; there are two scanning lines (Scan(n) and Scan(n+1)) and one luminescence control line EM(n+1) at P3; and there are two scanning lines (Scan(n) and Scan(n+1)) and one luminescence control line EM(n+1) at P4. Therefore, the bending structures in the prior art all include two scanning lines, which causes the bending structure to be too wide, which affects a bending performance of the bending structures. The embodiments of the present disclosure can solve the above-mentioned defects.

Figure 5:
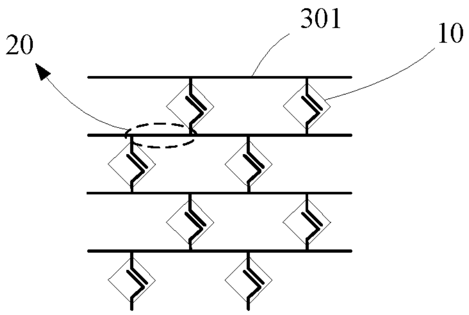
FIG. 5 is a schematic diagram of wirings of scanning lines provided by an embodiment of the present disclosure.

In FIG. 4 and FIG. 5, a schematic diagram of a basic structure of a display panel provided by an embodiment of the present disclosure and a schematic diagram of wirings of scanning lines provided by an embodiment of the present disclosure are shown, respectively. The display panel includes a plurality of island-shaped units 10 and a plurality of bending structures 20; the plurality of the island-shaped units 10 are arranged separately; adjacent two of the island-shaped units 10 are stretched and being connected by one of the bending structures 20, each of the bending structures 20 includes a plurality of metal lines 30, adjacent two of the island-shaped units 10 are electrically connected to each other through the plurality of the metal lines 30, and the plurality of the metal lines 30 include merely one scanning line 301.

It should be noted that the display panel provided by the embodiments of the present disclosure is a retractable display panel, wherein each of the island-shaped units 10 is one display unit, the display unit includes a pixel circuit, and control signals of the pixel circuit are connected to each other through a plurality of metal lines 30, and the bending structure 20 between the island-shaped units 10 is a flexible and stretchable structure, which can be deformed when subjected to external force, so that an overall shape of the display panel is not fixed, and can be deformed in any direction and has an ability to stretch and recover, and broadly application foreground.

It should be noted that the plurality of the metal lines 30 in the plurality of the bending structures 20 extending in a row direction form a signal line group, and the signal line group includes merely one scanning line 301, and the scanning line 301 is continuously distributed (as shown in FIG. 5). As shown in FIGS. 1 to 3B, a single island-shaped unit in the prior art cannot connect two signal line groups at a same time. Therefore, if one pixel circuit need Scan(n−1) and Scan(n) signals to control, then two scanning lines (Scan(n−1) and Scan(n)) need to be set in one signal line group, which causes the bending structure to be too wide, which affects a bending performance of the bending structures. However, with a structure of the display panel provided by the embodiments of the present disclosure, merely one scanning line 301 is set in one signal line group, and the island-shaped unit 10 is electrically connected to two of the scanning lines 301 in adjacent two of the signal line groups, respectively, it is realized that a pixel circuit is controlled by the Scan(n−1) and Scan(n) signals at a same time, and compared with two scanning lines (Scan(n−1), Scan(n)) that need to be set in one existing bending structure, one scanning line is reduced, so that the width of the bending structures 20 is reduced, and the bending performance of the bending structures 20 is improved.

Continuing to refer to FIG. 4, in one embodiment, each of the island-shaped units 10 is connected to four of the bending structures 20 respectively. Specifically, each of the island-shaped units 10 is electrically connected to adjacent four of the island-shaped units 10 through four of the bending structures 20. The four of the bending structures 20 are moved in a direction away from the island-shaped units 10 to enlarge a size of the display panel; the four of the bending structures 20 are moved in a direction close to the island-shaped unit 10 to compress the size of the display panel, which can realize deformability and stretch recovery in any direction.

In one embodiment, among the four of the bending structures 20 connected to one of the island-shaped units 10, scanning lines 301 in adjacent two of the bending structures 20 are parts of a same scanning line 301.

It can be understood that, as shown in FIG. 5, the scanning lines 301 in the plurality of the bending structures 20 extending along a same row are all a same scanning line, island-shaped units 10 are connected to a top and a bottom scanning lines 301 respectively, so that the Scan(n−1) signal can be obtained and the Scan(n) signal can also be obtained, and merely one scanning line 301 is needed to be set in one of the bending structures 20, compared with two scanning lines (Scan(n−1), Scan(n)) that need to be set in one existing bending structure, one scanning line is reduced, so that the width of the bending structures 20 is reduced, and the bending performance of the bending structures 20 is improved.

Continuing to refer to FIG. 4, in one embodiment, each of the island-shaped units 10 includes a first protruding portion 101 and a second protruding portion 102, and the first protruding portion 101 and the second protruding portion 102 are disposed opposite to each other; among the four of the bending structures 20 connected to one of the island-shaped units 10, the adjacent two of the bending structures 20 are connected to a same first protruding portion 101 or a same second protruding portion 102.

It can be understood that, in embodiments of the present disclosure, by disposing the first protruding portion 101 and the second protruding portion 102 at two ends of the island-shaped unit 10 respectively, a distance between two of the signal line groups can be increased, that is, an area of a blank area (i.e., a hollow area) surrounded by four of the island-shaped units 10 and four of the bending structures 20 is increased, an expansion and contraction range of the display panel is increased, and the deformation of the display panel is more diversified.

In one embodiment, in a direction from the first protruding portion 101 to the second protruding portion 102, a height of the first protruding portion 101 and a height of the second protruding portion 102 are both greater than or equal to 1 micrometer and less than or equal to 100 micrometers. It can be understood that the height of the first protruding portion 101 and the height of the second protruding portion 102 are determined according to a resolution of the display panel. When the resolution of the display panel needs to be increased, this can be achieved by reducing the height of the first protruding portion 101 and raising the height of the second protruding portion 102.

In one embodiment, in the direction from the first protruding portion 101 to the second protruding portion 102, the height of the first protruding portion 101 is equal to the height of the second protruding portion 102. It can be understood that, in the embodiments of the present disclosure, by setting the height of the first protruding portion 101 equal to the height of the second protruding portion 102, the island-shaped units 10 are distributed more uniformly, so that the bending structures 20 are subjected to more uniform force and are not easily cracked.

Figure 6:
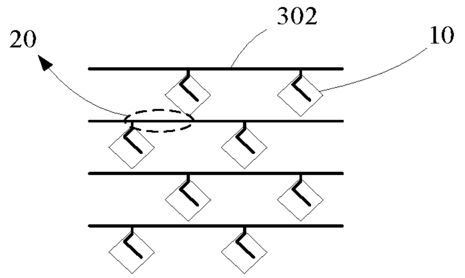
FIG. 6 is a schematic diagram of wirings of luminescence control lines provided by an embodiment of the present disclosure.
Figure 7:
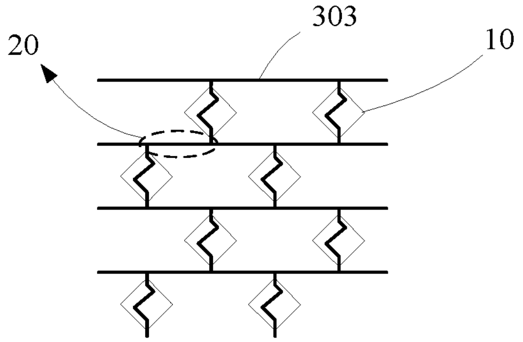
FIG. 7 is a schematic diagram of wirings of initialization power lines provided by an embodiment of the present disclosure.
Figure 8:
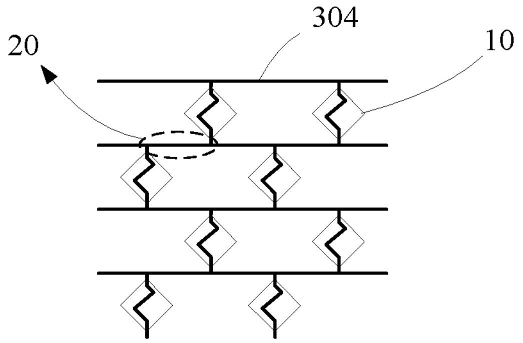
FIG. 8 is a schematic diagram of wirings of driving power lines provided by an embodiment of the present disclosure.
Figure 9:
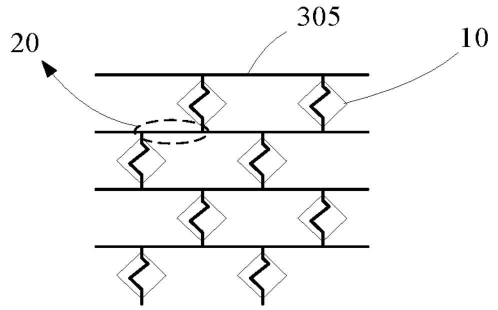
FIG. 9 is a schematic diagram of wirings of common power lines provided by an embodiment of the present disclosure.

In one embodiment, the plurality of metal lines 30 further include luminescence control lines 302 (as shown in FIG. 6), initialization power lines 303 (as shown in FIG. 7), driving power lines 304 (as shown in FIG. 8), and common power lines 305 (as shown in FIG. 9). Next, please refer to FIG. 6, which is a schematic diagram of the wiring of the luminescence control lines provided by the embodiments of the present disclosure, wherein each of the island-shaped units 10 is electrically connected to adjacent one of the luminescence control lines 302. It should be noted that the luminescence control lines 302 are mainly used in the light-emitting stage of the pixel circuit. When in the light-emitting stage, a low level is given to the luminescence control lines 302 to make the display unit emit light, thereby forming a corresponding image. Wirings of the luminescence control line 302 and wirings of the scanning line 301 are similar, and are continuously distributed along the row direction, and are not connected up and down through the island-shaped units 10. Compared with two of the luminescence control lines at P1 of the bending structure in the prior art, one luminescence control line is reduced, the width of the bending structure 20 is reduced, and the bending performance of the bending structure 20 is improved.

Next, please refer to FIG. 7, which is a schematic diagram of wirings of initialization power lines provided by an embodiment of the present disclosure. Adjacent two of the initialization power lines 303 are electrically connected through the island units 10 located between the adjacent two of the initialization power lines 303. That is, adjacent two of the initialization power lines 303 are connected through the plurality of island-shaped units 10 to form a mesh structure, which can reduce IR-drop (voltage drop) and improve display uniformity of the display panel.

Next, please refer to FIG. 8, which is a schematic diagram of wirings of driving power lines provided by an embodiment of the present disclosure. Adjacent two of the driving power lines 304 are electrically connected through the island units 10 located between the adjacent two of the driving power lines 304. That is, adjacent two of the driving power lines 304 are connected through the plurality of island-shaped units 10 to form a mesh structure, which can reduce IR drop (voltage drop) and improve the display uniformity of the display panel.

Next, please refer to FIG. 9, which is a schematic diagram of wirings of common power lines provided by an embodiment of the present disclosure. Adjacent two of the common power lines 305 are electrically connected through the island units 10 located between the adjacent two of the common power lines 305. That is, adjacent two of the common power lines 305 are connected through the plurality of island-shaped units 10 to form a mesh structure, which can reduce IR drop (voltage drop) and improve the display uniformity of the display panel.

Figure 10:
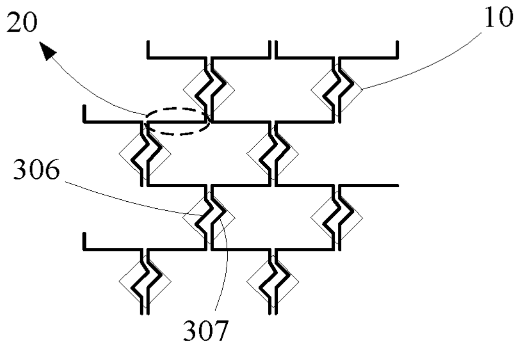
FIG. 10 is a schematic diagram of wirings of data lines provided by an embodiment of the present disclosure.

Next, please refer to FIG. 10, which is a schematic diagram of wirings of data lines provided by an embodiment of the present disclosure. Wherein the display panel includes a plurality of first data lines 306 and a plurality of second data lines 307; and each of the island-shaped units 10 is provided with one of the first data lines 306 and one of the second data lines 307 passing through; a first end of one of the first data lines 306 passing through one of the island-shaped units 10 is electrically connected to a second end of one of the second data lines 307 passing through an adjacent one of the island-shaped units 10 through one of the bending structures 20; a second end of the one of the first data lines 306 passing through the one of the island-shaped units 10 is electrically connected to a first end of another one of the second data lines 307 passing through another adjacent of the island-shaped units 10 through another one of the bending structures 20; and a first end of the one of the second data lines 307 passing through the one of the island-shaped units 10 is electrically connected to a second end of another one of the first data lines 306 passing through another adjacent of the island-shaped units 10 by another one of the bending structures 20; a second end of the one of the second data lines 307 passing through the one of the plurality of island-shaped units 10 is electrically connected to a first end of another one of the first data lines 306 passing through another adjacent of the island-shaped units 10 through another one of the bending structures 20.

It can be understood that, both the first data line 306 and the second data line 307 pass through the island-shaped units 10 and are connected above and below to the bending structure 20, and merely one data line (the first data line 306 or the second data line 307) is set in each of the bending structures 20 of the display panel provided by the embodiment of the present disclosure. Compared with three data lines (data R/G/B) corresponding to one bending structure in the prior art of FIG. 1, two data lines are reduced, the width of the bending structures 20 is reduced, and the bending performance of the bending structures 20 is improved.

Figure 11A:
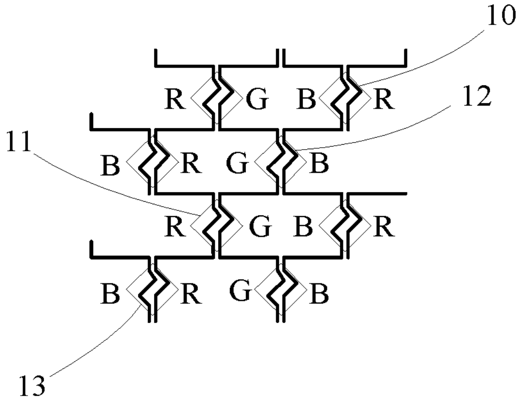
FIG. 11A is a schematic diagram of a first arrangement of island-shaped units provided by an embodiment of the present disclosure.

Next, please refer to FIG. 11*a*, which is a schematic diagram of a first arrangement of island-shaped units provided by an embodiment of the present disclosure. Each of the island-shaped units 10 is one display unit, the plurality of the island-shaped units 10 includes a plurality of first display units 11, a plurality of second display units 12, and a plurality of third display units 13, sub-pixels of each one of the first display units 11 are a red sub-pixel and a green sub-pixel (RG), sub-pixels of each one of the second display units 12 are a green sub-pixel and a blue sub-pixels (GB), and sub-pixels of each one of the third display units 13 are a blue sub-pixel and a red sub-pixel (BR). Wherein, four of the island-shaped units 10 adjacent to a same one of the first display unit 11 are two of the second display units 12 and two of the third display units 13 respectively, and two of the second display units 12 are located on a side of the same one of the first display units 11, two of the third display units 13 are located on another side of the same one of the first display units 11.

It should be noted that, in FIG. 11A, the first display unit 11 is a red sub-pixel and a green sub-pixel (RG), the second display unit 12 is a green sub-pixel and a blue sub-pixel (GB), and the third display unit 13 is a blue sub-pixel and a red sub-pixel (BR) are shown as an example, wherein four of the island-shaped units 10 adjacent to a same one of the first display unit 11 (RG) are two of the second display units 12 (GB) and two of the third display units 13 (BR) respectively, and two of the second display units 12 (GB) are located on a side (right side) of the same one of the first display units 11 (RG), two of the third display units 13 (BR) are located on another side (left side) of the same one of the first display units 11. Other implementation manners are not repeated here.

Figure 11B:
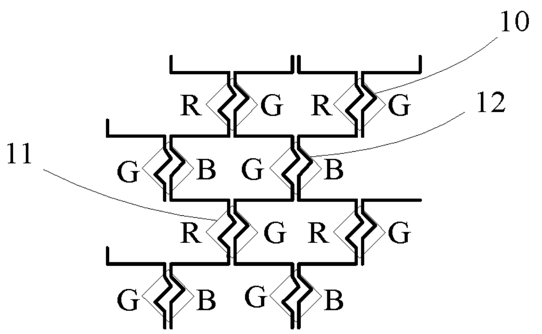
FIG. 11B is a schematic diagram of a second arrangement of island-shaped units provided by an embodiment of the present disclosure.
Figure 12A:
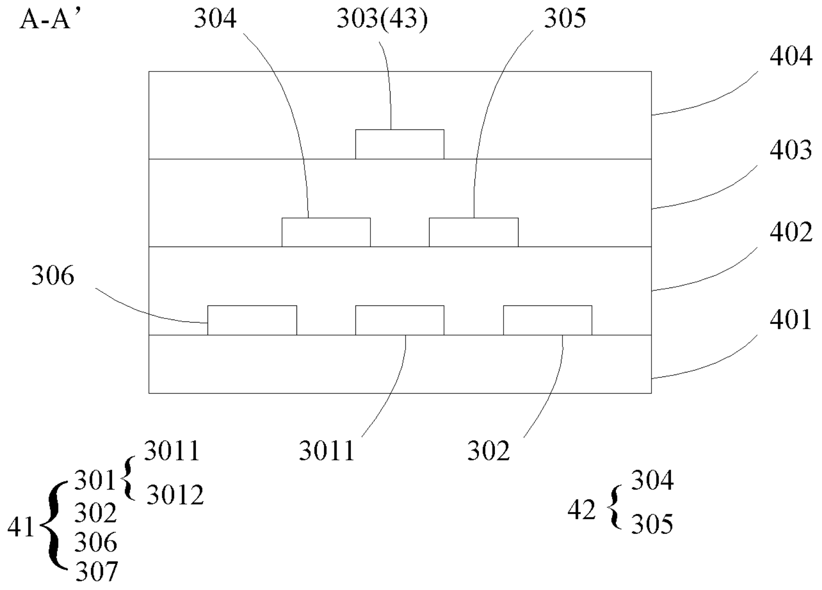
FIG. 12A is a cross-sectional view of the display panel in FIG. 4 along a direction A-A'.
Figure 12B:
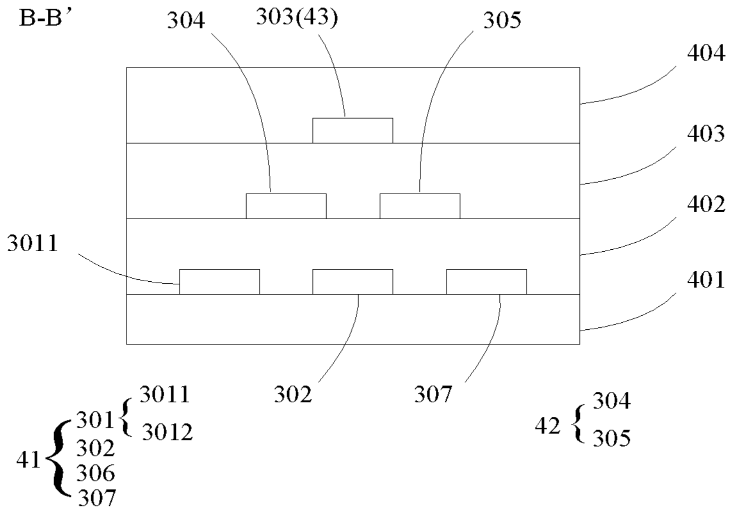
FIG. 12B is a cross-sectional view of the display panel in FIG. 4 along a direction B-B'.
Figure 12C:
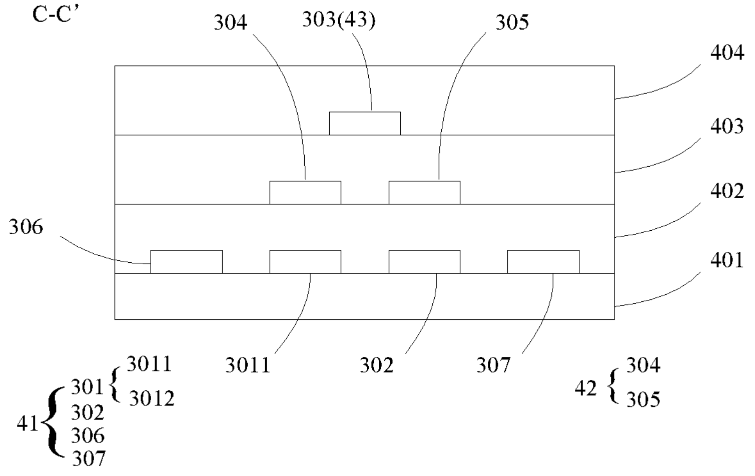
FIG. 12C is a cross-sectional view of the display panel in FIG. 4 along a direction C-C'.
Figure 12D:
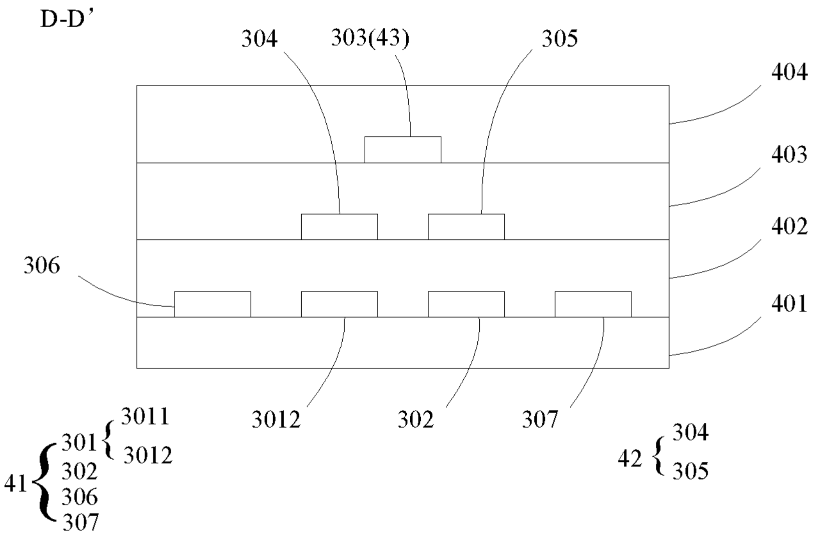
FIG. 12D is a cross-sectional view of the display panel in FIG. 4 along a direction D-D'.

Next, please refer to FIG. 11B, which is a schematic diagram of a second arrangement of island-shaped units provided by an embodiment of the present disclosure. Each of the island-shaped units 10 is one display unit, the plurality of the island-shaped units 10 include a plurality of first display units 11 and a plurality of second display units 12, sub-pixels of each of the first display units 11 are a red sub-pixel and a green sub-pixel (RG), and sub-pixels of each of the second display units 12 are a green sub-pixel and a blue sub-pixel (GB); wherein, four of the island-shaped units 10 adjacent to a same one of the first display unit 11 are all the second display units 12.

It should be noted that, in FIG. 11B, the first display unit 11 is a red sub-pixel and a green sub-pixel (RG), and the second display unit 12 is a green sub-pixel and a blue sub-pixel (GB) are shown as an example, wherein four of the island-shaped units 10 adjacent to a same one of the first display unit 11 (RG) are all the second display units 12 (GB). Other implementation manners are not repeated here.

It should be noted that, in FIG. 11A, a data line only transmits the R signal, or only transmits the G signal, or only transmits the B signal. In FIG. 11B, a data line only transmits G signal, or transmits both R signal and B signal (different rows can be switched on by customizing a driver chip, and different data signal R or B can be transmitted).

Next, please refer to FIG. 12A to FIG. 12D, in one embodiment, the display panel further includes a substrate layer 401, a first metal layer 41, a second metal layer 42, and a third metal layer 43; the first metal layer 41 is disposed on the substrate layer 401, and the first metal layer 41 is patterned to form the scanning lines 301, the luminescence control lines 302, the first data lines 306, and the second data lines 307; the second metal layer 42 is disposed on the first metal layer 41, the second metal layer 42 is patterned to form the driving power lines 304 and the common power lines 305; and the third metal layer 43 is disposed on the second metal layer 42, the third metal layer 43 is patterned to form the initialization power lines 303; wherein, an orthographic projection of the third metal layer 43, an orthographic projection of the second metal layer 42, an orthographic projection of the first data lines 306, and an orthographic projection of the second data lines 307 on the substrate layer 401 do not overlap.

Specifically, FIGS. 12A, 12B, 12C, and 12D are respectively a cross-sectional view of the display panel in FIG. 4 along the direction A-A', a cross-sectional view of the display panel in FIG. 4 along the direction B-B', and a cross-sectional view of the display panel in FIG. 4 along the direction C-C', and a cross-sectional view of the display panel in FIG. 4 along the direction D-D', wherein the bending structure of the cross-sectional view along the A-A' direction includes a scanning line 3011 (i.e., Scan(n−1)) and a luminescence control line 302, and compared with the bending structure of the prior art at P1, one scanning line and one luminescence control line are reduced; the bending structure of the cross-sectional view along the B-B' direction includes one scanning line 3011 (i.e., Scan(n−1)) and a luminescence control line 302, and compared with the bending structure of the prior art at P2, one scanning line is reduced; the bending structure of the cross-sectional view along the C-C' direction includes one scanning line 3011 (i.e., Scan(n−1)) and one luminescence control line 302, and compared with the bending structure of the prior art at P3, one scanning line is reduced; and the bending structure in the cross-sectional view along the D-D' direction includes a scanning line 3012 (i.e., Scan(n)) and one luminescence control line 302, and compared with the bending structure of the prior art at P4, one scanning line is reduced. Therefore, by using the display panel provided by the embodiments of the present disclosure, the scanning lines in the bending structure can be reduced, so that the width of the bending structure is reduced, and the bending performance of the bending structure is improved.

It should be noted that, by setting the orthographic projection of the third metal layer 43, the orthographic projection of the second metal layer 42, the orthographic projection of the first data lines 306, and the orthographic projection of the second data lines 307 on the substrate layer 401 are non-overlapping, it is possible to avoid parasitic capacitance being generated among the initialization power lines 303, the driving power lines 304, the common power lines 305, the first data line 306, and the second data line 307 to avoid affecting the pixel circuit.

It should be noted that, a first planarization layer 402 is further provided between the first metal layer 41 and the second metal layer 42, a second planarization layer 403 is further provided between the second metal layer 42 and the third metal layer 43, and a third planarization layer 404 is further disposed on one side of the third metal layer 43 away from the second planarization layer 403. Wherein the first planarization layer 402, the second planarization layer 403, and the third planarization layer 404 are used to separate the first metal layer 41, the second metal layer 42, and the third metal layer 43, and to fill a level difference between the first metal layer 41, the second metal layer 42, and the third metal layer 43.

An embodiment of the present disclosure further provides a display terminal, including a terminal body and the above-mentioned display panel, wherein the terminal body and the display panel are combined into one. Please refer to FIGS. 4 to 12D and related descriptions for the structure of the display panel. It will not be repeated here. The display terminal provided by the embodiment of the present disclosure may be a product or component with a display function, such as a mobile phone, a tablet computer, a notebook computer, a television, a digital camera, and a navigator, etc.

To summarize, the display panel provided by the embodiments of the present disclosure includes a plurality of island-shaped units and a plurality of bending structures; the plurality of the island-shaped units are arranged separately;, adjacent two of the island-shaped units are stretched and are connected by one of the bending structures, each of the bending structures includes a plurality of metal lines, adjacent two of the island-shaped units are electrically connected to each other through the plurality of the metal lines, and the plurality of the metal lines include merely one scanning line. Only one scanning line is provided in a bending structure of the display panel of the present disclosure, compared with two scanning lines (Scan(n−1), Scan(n)) that need to be set in one existing bending structure, one scanning line is reduced, so that the width of the bending structure is reduced, and the bending performance of the bending structure is improved, a technical problem that a large number of metal wires in the bending structure of the display panel of the prior art is solved, which causes the bending structure to be too wide and affects the bending performance of the bending structure.

The display panel and the display terminal provided by the embodiments of the present disclosure are described in detail above. It should be understood that the exemplary embodiments described herein should be regarded as descriptive only, and are used to help understand the method and the core idea of the present application, but not to limit the present application.

What is claimed is:

1. A display panel, comprising:

a plurality of island-shaped units, wherein each of the island-shaped units is one display unit, and the plurality of the island-shaped units are arranged separately; and a plurality of bending structures, wherein adjacent two of the island-shaped units are stretched and connected by one of the bending structures, each of the bending structures comprises a plurality of metal lines, adjacent two of the island-shaped units are electrically connected to each other through the plurality of the metal lines, the plurality of the metal lines in the plurality of bending structures extending in a row direction form a signal line group, and the signal line group does not pass through areas of the display panel corresponding to the plurality of island-shaped units and comprises merely one scanning line; and the scanning line in the signal line group is continuously distributed in a same metal layer; and wherein each of the island-shaped units comprises a first protruding portion and a second protruding portion connected to the bending structures, the first protruding portion and the second protruding portion are disposed opposite to each other, and the scanning line included in the bending structures connected to the first protruding portion is different from and does not intersect with the scanning line included in the bending structures connected to the second protruding portion.

2. The display panel in claim 1, wherein each of the island-shaped units is connected to four of the bending structures respectively.

3. The display panel in claim 2, wherein among the four of the bending structures connected to one of the island-shaped units, scanning lines in adjacent two of the bending structures are part of a same scanning line.

4. The display panel in claim 3, wherein among the four of the bending structures connected to one of the island-shaped units, the adjacent two of the bending structures are connected to a same of the first protruding portion or a same of the second protruding portion.

5. The display panel in claim 4, wherein in a direction from the first protruding portion to the second protruding portion, a height of the first protruding portion and a height of the second protruding portion are both greater than or equal to 1 micrometer and less than or equal to 100 micrometers.

6. The display panel in claim 5, wherein in the direction from the first protruding portion to the second protruding portion, the height of the first protruding portion is equal to the height of the second protruding portion.

7. The display panel in claim 1, wherein the plurality of the metal lines further comprise luminescence control lines, initialization power lines, driving power lines, and common power lines, and each of the luminescence control lines, the initialization power lines, driving power lines, and the common power lines is continuously distributed in a same metal layer;

wherein each of the island-shaped units is electrically connected to an adjacent one of the luminescence control lines; adjacent two of the initialization power lines are electrically connected through the island-shaped units located between the adjacent two of the initialization power lines;

adjacent two of the driving power lines are electrically connected through the island-shaped units located between the adjacent two of the driving power lines; and adjacent two of the common power lines are electrically connected through the island-shaped units located between the adjacent two of the common power lines.

8. The display panel in claim 7, wherein the display panel further comprises a plurality of first data lines and a plurality of second data lines; each of the island-shaped units is provided with one of the first data lines and one of the second data lines passing through the island-shaped unit;

wherein a first end of one of the first data lines passing through one of the island-shaped units is electrically connected to a second end of one of the second data lines passing through an adjacent one of the island-shaped units through one of the bending structures; and a second end of the one of the first data lines passing through the one of the island-shaped units is electrically connected to a first end of another one of the second data lines passing through another adjacent of the island-shaped units through another one of the bending structures;

wherein a first end of the one of the second data lines passing through the one of the island-shaped units is electrically connected to a second end of another one of the first data lines passing through another adjacent of the island-shaped units through another one of the island-shaped units; a second end of the one of the second data lines passing through the one of the plurality of island-shaped units is electrically connected to a first end of another one of the second data lines passing through another adjacent of the island-shaped units through another one of the bending structures;

wherein the display panel further comprises:

a substrate layer;

a first metal layer disposed on the substrate layer, the first metal layer being patterned to form the scanning lines, the luminescence control lines, the first data lines, and the second data lines;

a second metal layer disposed on the first metal layer, the second metal layer being patterned to form the driving power lines and the common power lines; and a third metal layer disposed on the second metal layer, the third metal layer being patterned to form the initialization power lines; and wherein an orthographic projection of the third metal layer, an orthographic projection of the second metal layer, an orthographic projection of the first data lines, and an orthographic projection of the second data lines on the substrate layer are non-overlapping.

9. The display panel in claim 8, wherein the plurality of the island-shaped units comprise a plurality of first display units, a plurality of second display units, and a plurality of third display units; sub-pixels of each of the first display units are a red sub-pixel and a green sub-pixel; sub-pixels of each of the second display units are a green sub-pixel and a blue sub-pixel; and sub-pixels of each of the third display units are a blue sub-pixel and a red sub-pixel;

wherein four of the island-shaped units adjacent to a same one of the first display units are two of the second display units and two of the third display units respectively, two of the second display units are located on a side of the same one of the first display units, and two of the third display units are located on another side of the same one of the first display units.

10. The display panel in claim 8, wherein each of the island-shaped units is one display unit, the plurality of the island-shaped units comprise a plurality of first display units and a plurality of second display units, sub-pixels of each of the first display units are a red sub-pixel and a green sub-pixel, and sub-pixels of each of the second display units are a green sub-pixel and a blue sub-pixel; and wherein four of the island-shaped units adjacent to a same one of the first display unit are all the second display units.

11. A display panel, comprising:

a plurality of island-shaped units, the plurality of the island-shaped units arranged separately; and a plurality of bending structures, wherein adjacent two of the island-shaped units are stretched and connected by one of the bending structures, each of the bending structures comprises a plurality of metal lines, adjacent two of the island-shaped units are electrically connected to each other through the plurality of the metal lines, the plurality of the metal lines comprises merely one scanning line;

wherein the plurality of the metal lines further comprise luminescence control lines, initialization power lines, driving power lines, and common power lines;

wherein each of the island-shaped units is electrically connected to an adjacent one of the luminescence control lines; adjacent two of the initialization power lines are electrically connected through the island-shaped units located between the adjacent two of the initialization power lines;

adjacent two of the driving power lines are electrically connected through the island-shaped units located between the adjacent two of the driving power lines; and adjacent two of the common power lines are electrically connected through the island-shaped units located between the adjacent two of the common power lines;

wherein the display panel further comprises a plurality of first data lines and a plurality of second data lines; each of the island-shaped units is provided with one of the first data lines and one of the second data lines passing through the island-shaped unit;

wherein a first end of one of the first data lines passing through one of the island-shaped units is electrically connected to a second end of one of the second data lines passing through an adjacent one of the island-shaped units through one of the bending structures; and a second end of the one of the first data lines passing through the one of the island-shaped units is electrically connected to a first end of another one of the second data lines passing through another adjacent of the island-shaped units through another one of the bending structures;

wherein a first end of the one of the second data lines passing through the one of the island-shaped units is electrically connected to a second end of another one of the first data lines passing through another adjacent of the island-shaped units through another one of the island-shaped units; a second end of the one of the second data lines passing through the one of the plurality of island-shaped units is electrically connected to a first end of another one of the second data lines passing through another adjacent of the island-shaped units through another one of the bending structures; and wherein the display panel further comprises:

a substrate layer;

a first metal layer disposed on the substrate layer, the first metal layer patterned to form the scanning lines, the luminescence control lines, the first data lines, and the second data lines;

a second metal layer disposed on the first metal layer, the second metal layer patterned to form the driving power lines and the common power lines; and a third metal layer disposed on the second metal layer, the third metal layer patterned to form the initialization power lines; and wherein an orthographic projection of the third metal layer, an orthographic projection of the second metal layer, an orthographic projection of the first data lines, and an orthographic projection of the second data lines on the substrate layer are non-overlapping.

12. A display terminal, comprising a terminal body and a display panel, the terminal body and the display panel being integrally combined, and the display panel comprising:

a plurality of island-shaped units, wherein each of the island-shaped units is one display unit, and the plurality of the island-shaped units are arranged separately; and a plurality of bending structures, adjacent two of the island-shaped units being stretched and connected by one of the bending structures, each of the bending structures comprising a plurality of metal lines, adjacent two of the island-shaped units being electrically connected to each other through the plurality of metal lines, the plurality of the metal lines in the plurality of bending structures extending in a row direction form a signal line group, wherein the signal line group does not pass through areas of the display panel corresponding to the plurality of island-shaped units and comprises merely one scanning line; and the scanning line in the signal line group is continuously distributed in a same metal layer; and wherein each of the island-shaped units comprises a first protruding portion and a second protruding portion connected to the bending structures, the first protruding portion and the second protruding portion are disposed opposite to each other, and the scanning line included in the bending structures connected to the first protruding portion is different from and does not intersect with the scanning line included in the bending structures connected to the second protruding portion.

13. The display terminal in claim 12, wherein each of the plurality of island-shaped units is connected to four of the plurality of bending structures respectively.

14. The display terminal in claim 13, wherein among the four of the bending structures connected to one of the island-shaped units, scanning lines in adjacent two of the bending structures are parts of a same scanning line.

15. The display terminal in claim 14, among the four of the bending structures connected to one of the island-shaped units, the adjacent two of the bending structures are connected to a same of the first protruding portion or a same of the second protruding portion.

16. The display terminal in claim 12, wherein the plurality of the metal lines further comprise luminescence control lines, initialization power lines, driving power lines, and common power lines, and each of the luminescence control lines, the initialization power lines, driving power lines, and the common power lines is continuously distributed in a same metal layer; and wherein each of the island-shaped units is electrically connected to an adjacent one of the luminescence control lines; adjacent two of the initialization power lines are electrically connected to each other through the island-shaped units located between the adjacent two of the initialization power lines; adjacent two of the driving power lines are electrically connected to each other through the island-shaped units located between the adjacent two of the driving power lines; and adjacent two of the common power lines are electrically connected to each other through the island-shaped units located between the adjacent two of the common power lines.

17. The display terminal in claim 16, wherein the display panel further comprises a plurality of first data lines and a plurality of second data lines; and each of the plurality of island-shaped units is provided with one of the first data lines and one of the second data lines passing through the island-shaped unit;

wherein a first end of one of the first data lines passing through one of the island-shaped units is electrically connected to a second end of one of the second data lines passing through an adjacent one of the island-shaped units through one of the bending structures; and a second end of the one of the first data lines passing through the one of the island-shaped units is electrically connected to a first end of another one of the second data lines passing through another adjacent of the island-shaped units through another one of the bending structures; and wherein a first end of the one of the second data lines passing through the one of the island-shaped units is electrically connected to a second end of another one of the first data lines passing through another adjacent one of the island-shaped units through another one of the island-shaped units; and a second end of another one of the second data lines passing through the one of the island-shaped units is electrically connected to a first end of another one of the second data lines passing through another adjacent one of the island-shaped units through another one of the bending structures.

18. The display terminal in claim 17, wherein the plurality of the island-shaped units comprise a plurality of first display units, a plurality of second display units, and a plurality of third display units, sub-pixels of each one of the first display units are a red sub-pixel and a green sub-pixel, sub-pixels of each one of the second display units are a green sub-pixel and a blue sub-pixel, and sub-pixels of each one of the third display units are a blue sub-pixel and a red sub-pixel;

wherein the four of the island-shaped units adjacent to a same one of the first display unit are two of the second display units and two of the third display units respectively, two of the second display units are located on a side of the same one of the first display units, and two of the third display units are located on another side of the same one of the first display units.

19. The display terminal in claim 17, wherein each of the island-shaped units is one display unit, the plurality of the island-shaped units comprise a plurality of first display units and a plurality of second display units, sub-pixels of each of the first display units are a red sub-pixel and a green sub-pixel, and sub-pixels of each of the second display units are a green sub-pixel and a blue sub-pixel; and wherein the four of the island-shaped units adjacent to a same one of the first display unit are all the second display units.

20. The display terminal in claim 17, wherein the display panel further comprises:

a substrate layer;

a first metal layer disposed on the substrate layer, the first metal layer being patterned to form the scanning lines, the luminescence control lines, the first data lines, and the second data lines;

a second metal layer disposed on the first metal layer, the second metal layer being patterned to form the driving power lines and the common power lines; and a third metal layer disposed on the second metal layer, the third metal layer being patterned to form the initialization power lines; and wherein an orthographic projection of the third metal layer, an orthographic projection of the second metal layer, an orthographic projection of the first data lines, and an orthographic projection of the second data lines on the substrate layer are non-overlapping.

* * * * *